United States Patent
Williams (10) Patent No.: US 9,023,188 B2
(45) Date of Patent: May 5, 2015

(54) COMPONENT PRODUCTION METHOD

(71) Applicant: Rolls-Royce PLC, London (GB)

(72) Inventor: Paul Edward Williams, Ashby de la Zouch (GB)

(73) Assignee: Rolls-Royce plc, London (GB)

( * ) Notice: Subject to any disclaimer, the term of this patent is extended or adjusted under 35 U.S.C. 154(b) by 39 days.

(21) Appl. No.: 13/714,060

(22) Filed: Dec. 13, 2012

(65) Prior Publication Data

US 2013/0175183 A1    Jul. 11, 2013

(30) Foreign Application Priority Data

Jan. 11, 2012   (GB) .................................. 1200360.4

(51) Int. Cl.

| | |
|---|---|
| *C25F 3/00* | (2006.01) |
| *B23H 3/00* | (2006.01) |
| *B23H 7/32* | (2006.01) |
| *C25F 3/22* | (2006.01) |
| *B23H 9/10* | (2006.01) |
| *B22F 3/15* | (2006.01) |
| *B22F 5/00* | (2006.01) |
| *B22F 5/10* | (2006.01) |
| *B22F 3/24* | (2006.01) |

(52) U.S. Cl.
CPC .. *C25F 3/22* (2013.01); *B23H 9/10* (2013.01); *B22F 2003/247* (2013.01); *B22F 3/15* (2013.01); *B22F 5/009* (2013.01); *B22F 5/106* (2013.01); *B22F 2998/10* (2013.01)

(58) Field of Classification Search
CPC ..... C25F 3/00–3/26; C22F 3/15; C22F 3/009; C22F 2003/247; B23H 9/10
USPC .................................................. 205/640–686
See application file for complete search history.

(56) References Cited

U.S. PATENT DOCUMENTS

| | | | | |
|---|---|---|---|---|
| 2,412,058 A | * | 12/1946 | Bessemer Pfeil Leonard ........................ | 205/661 |
| 4,023,966 A | | 5/1977 | Loersch et al. | |
| 4,475,983 A | * | 10/1984 | Bader et al. .................... | 205/656 |
| 4,522,692 A | * | 6/1985 | Joslin ............................. | 205/653 |
| 4,529,452 A | | 7/1985 | Walker | |
| 4,563,257 A | * | 1/1986 | Sova .............................. | 205/661 |
| 5,299,353 A | * | 4/1994 | Nazmy et al. ................. | 29/889.7 |

(Continued)

FOREIGN PATENT DOCUMENTS

| | | |
|---|---|---|
| JP | A-64-034610 | 2/1989 |
| JP | A-06-299206 | 10/1994 |
| SU | 1 726 134 A1 | 4/1992 |

OTHER PUBLICATIONS

Davidson, A. et al. "Influence of surface layer on properties of hipped Ti-6Al-4V" Materials Science and Technology, 2006, vol. 22, No. 5, p. 553-560. (published May 1, 2006).*

(Continued)

*Primary Examiner* — Nicholas A Smith
*Assistant Examiner* — Brian W Cohen
(74) *Attorney, Agent, or Firm* — Oliff PLC (57) ABSTRACT

A method of producing a component includes the steps of: providing a workpiece generated by hot isostatic pressing a powder metal form; and electropolishing a surface of the workpiece to remove a substantially uniform surface layer of the workpiece to produce the component. Following the electropolishing step, the component has substantially the same shape as the workpiece produced by the hot isostatic pressing step.

18 Claims, 6 Drawing Sheets

(56) References Cited

U.S. PATENT DOCUMENTS

| | | |
|---|---|---|
| 5,409,781 A | 4/1995 | Rosler et al. |
| 5,897,718 A | 4/1999 | Hessell et al. |
| 6,582,585 B2 * | 6/2003 | Poubanne et al. ............ 205/682 |
| 6,676,825 B1 | 1/2004 | Gebhart |
| 2003/0089621 A1 | 5/2003 | Anderson et al. |
| 2006/0047309 A1 | 3/2006 | Cichocki, Jr. |
| 2007/0051639 A1 * | 3/2007 | Mazur et al. .................. 205/666 |
| 2007/0215463 A1 | 9/2007 | Parkhe |
| 2007/0256939 A1 * | 11/2007 | Wei et al. ...................... 205/674 |
| 2009/0008264 A1 * | 1/2009 | McGee et al. ................ 205/640 |

OTHER PUBLICATIONS

Qui, Chunlei. "Net-Shape Hot Isostatic Pressing of a Nickel-Based Powder Superalloy" Doctor of Philosophy, The University of Birmingham, Nov. 2010.*

European Search Report issued in Application No. 12 19 6988; Dated Apr. 19, 2013.

British Search Report issued in Application No. 1200360.4; Dated May 9, 2012.

* cited by examiner

COMPONENT PRODUCTION METHOD

FIELD OF THE INVENTION

The present invention relates to a method of improving the performance of a component through improving the surface material properties. More particularly, the method relates to the removal of a uniform surface layer from a powder hot isostatically pressed (PHIP) work-piece.

BACKGROUND OF THE INVENTION

Figure 1:
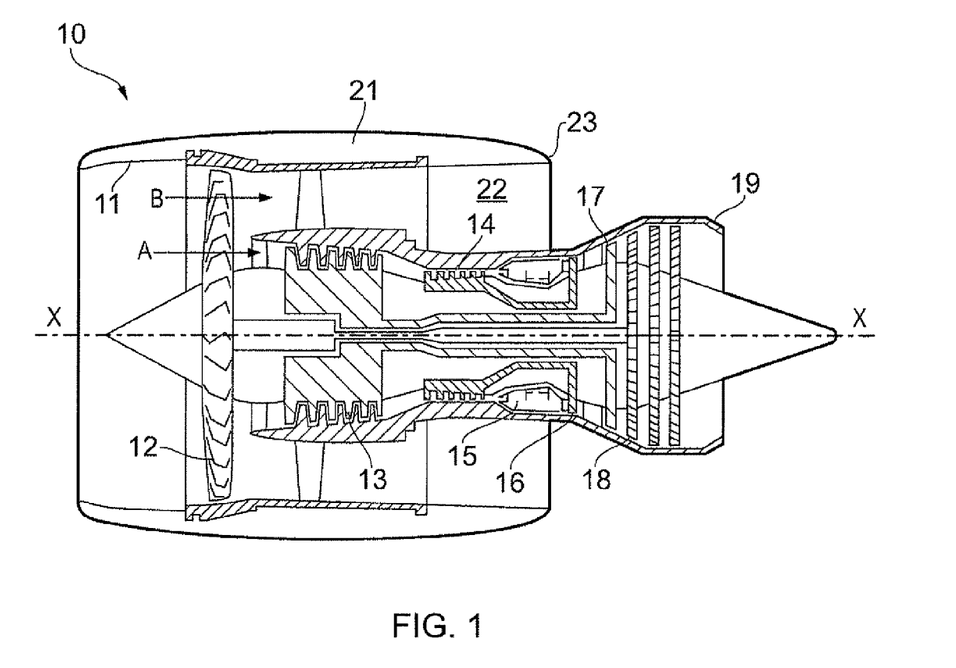
FIG. 1 shows a longitudinal cross section through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The combustion equipment 15 typically includes a combustor case, which may be manufactured from a nickel base superalloy, such as Waspaloy™. Such alloys provide high temperature capabilities. However, with the demand for ever increasing engine efficiencies, combustion temperatures are increasing to a point where conventional superalloys do not satisfy thermal capability and creep-life requirements.

Thus new materials with improved creep-life performance at higher temperatures are being adopted. One such material is the nickel base superalloy (hereafter designated as RR1000) described in U.S. Pat. No. 5,897,718.

RR1000 has excellent high temperature properties, but it is extremely difficult to machine and form/forge, and as a result, conventional machining may be economically or technically prohibitive. In particular, techniques used to manufacture Waspaloy combustor casings, such as ring roll forming and machining, are not suitable for RR1000. Components made from RR1000 are, therefore, typically formed via a powder metallurgy route.

For example, Hot Isostatic Pressing (HIP) is a near net shape technique which can be used to form RR1000 combustor casings. The HIP process uses an inner and outer metal (e.g. carbon steel) tool whose internal surfaces have conventionally machined features which are a negative form of the features required on the net shape formed component. The assembled tool is filled with RR1000 powder and the powder is compressed. The tool and powder form is then placed into a large HIP vessel that maintains a compressive force on the tooling and on to the powder within the tooling cavity. The temperatures and pressures applied during the HIP process are sufficiently high within the HIP vessel to diffusion bond the RR1000 powder particles together into a workpiece.

Unfortunately, however, elements from the tooling also diffuse into the outer layer of the RR1000 workpiece. This diffusion band has undesirable effects on material properties. In particular, the carbon from even an ultra low carbon steel tool can migrate into the RR1000 grain boundary interstitials, stressing the boundaries. Iron also diffuses into the powder alloy, producing undesirable effects. Crack initiation sites can result which could cause catastrophic part failure if unaddressed. However, as indicated above, conventional machining of the whole outer surface of the workpiece to remove the diffusion band would be extremely difficult due to the RR1000 material properties and time consuming, and if carried out would result in an unacceptably high part cost for the casing.

SUMMARY OF THE INVENTION

Thus an object of the present invention is to provide an alternative method of effecting surface layer removal of a hot isostatically pressed workpiece.

Accordingly, in a first aspect, the present invention provides a method of producing a component comprising the steps of:
  providing a workpiece generated by hot isostatic pressing a powder metal form; and
  electropolishing a surface of the workpiece to remove a substantially uniform surface layer of the workpiece to produce the component, wherein, following the electropolishing step, the component has substantially the same shape as the workpiece produced by the hot isostatic pressing step.

Advantageously, removal of a uniform surface layer by electropolishing can be performed significantly more economically than conventional machining, facilitating not only the manufacture of components made from latest generation, improved creep-life superalloys, but also from more conventional superalloys, while maintaining the shape provided by the hot isostatic pressing step. Electropolishing in the manner described herein removes a uniform surface layer of substantially equal, i.e. uniform thickness across the treated surface, thereby maintaining the shape of the workpiece produced by the hot isostatic pressing step.

The method may have any one or, to the extent that they are compatible, any combination of the following optional features.

The providing step can be a step of: hot isostatic pressing the powder metal form to generate the workpiece.

Preferably, the hot isostatic pressing uses tooling (e.g. iron-based tooling, such as mild steel, low carbon steel or ultra low carbon steel tooling) to define the powder metal form, a surface layer of the generated workpiece being contaminated by diffusion of elements from the tooling, and the electropolishing removes the contaminated surface layer.

Preferably, the raw material used by the HIP process to create the component is in a powder form. The powder raw material can include a single alloy of nickel superalloy or other metal or alloy, but could also comprise different combinations of metal alloys, or non metallic materials.

The produced component can be a net shape or near net shape component. That is, advantageously, the electropolishing can be performed in such a way that no or only minimal further finishing of the component is required.

Typically, the removed surface layer has a thickness in the range from 0 to 500 µm, and may have a thickness in the range 0 to 300 µm. This is enough surface removal to remove most diffusion bands resulting from a HIP process. The variation in the thickness of the surface layer removed by the electropolishing step may be less than 83 µm, and may be less than 70 µm, and may be less than one third or one sixth of the thickness of the surface layer. Thus the removed surface layer is substantially uniform to within required tolerances.

During the electropolishing, the workpiece may be bathed in an electrolyte containing one or more acids selected from the group consisting of sulphuric acid, phosphoric acid and sulfonic acid (the sulfonic acid can be single or multiple alkane sulfonic acid). Glycolic acid may optionally be added to the electrolyte e.g. to further improve surface finish.

During the electropolishing, the electrolyte may be maintained at a temperature in the range from 15 to 95° C. and preferably 45 to 75° C. The current density may be in the range from 5 to 50 A/dm$^2$ direct current. The peak voltage may be less than 16 Volts.

Typically, during the electropolishing, the workpiece forms the anode and the surface layer of the workpiece is removed by anodic dissolution.

The cathode may comprise a method defining a plurality of openings through which the electrolyte can flow. Such a configuration can be used to enhance electrolyte replenishment to the polished regions and also promote effective gas bubble evacuation, further improving the process.

During the electropolishing step, the workpiece may be partly immersed in an electrolyte and the cathode may be at least partially immersed in the electrolyte, the cathode at least surrounding the submerged part of the workpiece. The workpiece may be rotated relative to the cathode such that, following one revolution of the workpiece, substantially the whole of the workpiece is submerged. The speed of rotation may typically be less than 4 rpm where the component comprises a gas turbine combustor or turbine casing. Such a method ensures that a relatively uniform surface layer is removed from the component, and is generally suitable for workpieces having a relatively uniform annular surface shape.

Alternatively, during the electropolishing, both the workpiece and the cathode may be wholly immersed in the electrolyte. The workpiece and the cathode may be rotated together, such that substantially no relative movement between the workpiece and the cathode occurs. This allows gas bubbles produced during the electropolishing process to be dislodged from the cathode and workpiece surfaces, thereby ensuring a uniform surface layer is removed. Such a method is generally suitable for workpieces having a relatively varied annular surface shape with features sufficiently prominent and discontinuous so as to place a requirement on the cathode to mirror these features.

During the electropolishing, the distance between the workpiece and the cathode is preferably in the range from 7 to 80 mm. Such a distance can provide sufficient electrolyte between the anode and cathode to transport ions in solution away from the workpiece, while also holding the reactants in solution without the need for complex electrolyte flow control systems to replenish the electrolyte between the anode and the cathode.

Preferably, the cathode is configured such that, during the electropolishing, a substantially uniform surface layer thickness is removed from the workpiece.

Preferably, the component is an annular gas turbine engine component such as a combustor case, a turbine case, or a compressor case. Where the part comprises an annulus having a hollow interior defining an inner surface, the cathode may comprise a two-part cathode having an inner part facing the inner surface of the annulus and an outer part facing the outer surface of the annulus. The cathode parts can be applied simultaneously or sequentially. Each of the outer annular cathode and the inner cathode can cover the entire respective surface or only a portion of the respective surface. In the latter case, the cathode can be moved relative to the respective surface to effect surface layer removal over whole of the part's outer surface. The cathodes may be annular in shape or may be segmented such that when assembled, they form an annular shape to contour the workpiece.

Alternatively, the component can be a non-annular gas turbine engine component.

In a second aspect, the present invention provides a component, such as a combustor case, produced by the method of the first aspect.

BRIEF DESCRIPTION OF THE DRAWINGS

Embodiments of the invention will now be described by way of example with reference to the accompanying drawings in which.

DETAILED DESCRIPTION

Figure 2:
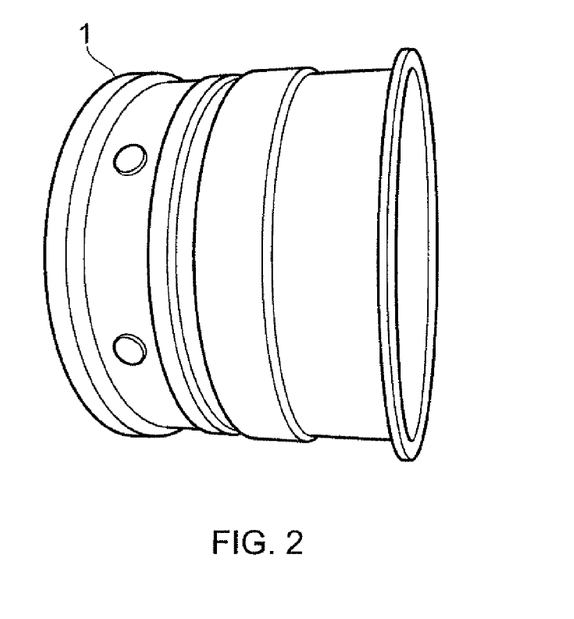
FIG. 2 shows a workpiece for a gas turbine engine annular combustor case.

FIG. 2 shows a workpiece 1 for a gas turbine engine annular combustor case. The workpiece is formed from a nickel base superalloy by a HIP process which uses steel tooling to shape and retain the superalloy metal powder during the application of the high temperatures and pressures of the process. As a result of using this tooling, a diffusion band is formed as a surface layer on the workpiece, the band containing elements such as iron and carbon which have diffused into the workpiece from the tooling. It is necessary to remove this layer to eliminate crack initiation sites from the surface of the case.

Electropolishing is used to remove a uniform surface layer comprising the diffusion band. The workpiece is connected to a positive electrode, resulting in the whole workpiece being positively charged as the anode. The cathode is an electrically conductive electrode, which is formed to broadly mirror the macroscopic contours and geometrical features of the workpiece (e.g. boss and flange forms on the workpiece appear in negative in the cathode). The mirroring serves to reduce anode-cathode gap and ultimately balances current flow to minimise preferential material removal around macroscopic prominent features such as external corners and protruding faces, i.e. to ensure a uniform surface thickness is removed. The cathode material is typically stainless steel.

Electropolishing can be distinguished from other electrochemical processes by the current density used. Electropolishing is carried out at a relatively low current density of around 10 to 50 A/dm$^2$. Electropolishing will remove a substantially uniform surface layer around the workpiece, such that the overall macroscopic shape of the component is maintained following the electropolishing process. This ensures that the net shape or near net shape form produced by the isostatic pressing process is maintained, thereby precluding or reducing the requirement for further mechanical machining steps, which may be difficult or economically prohibitive.

The cathode has an inner and an outer part for effecting electropolishing of respectively the inner and outer surface of the workpiece. Each part may be a complete annulus or divided up into multiple sections. Each of the sections can be used together to machine the whole of the inner or outer surface simultaneously, or used individually to sequentially treat sections of the work-piece.

Likewise, the work-piece can be electropolished internally and externally simultaneously or sequentially by treating say the inner surface with the inner part of the electrode and then the outer surface with the outer part of the electrode. Sequential treatment can be advantageous if, for example, there are power supply limits on the total surface area that can be treated at once.

Figure 3:
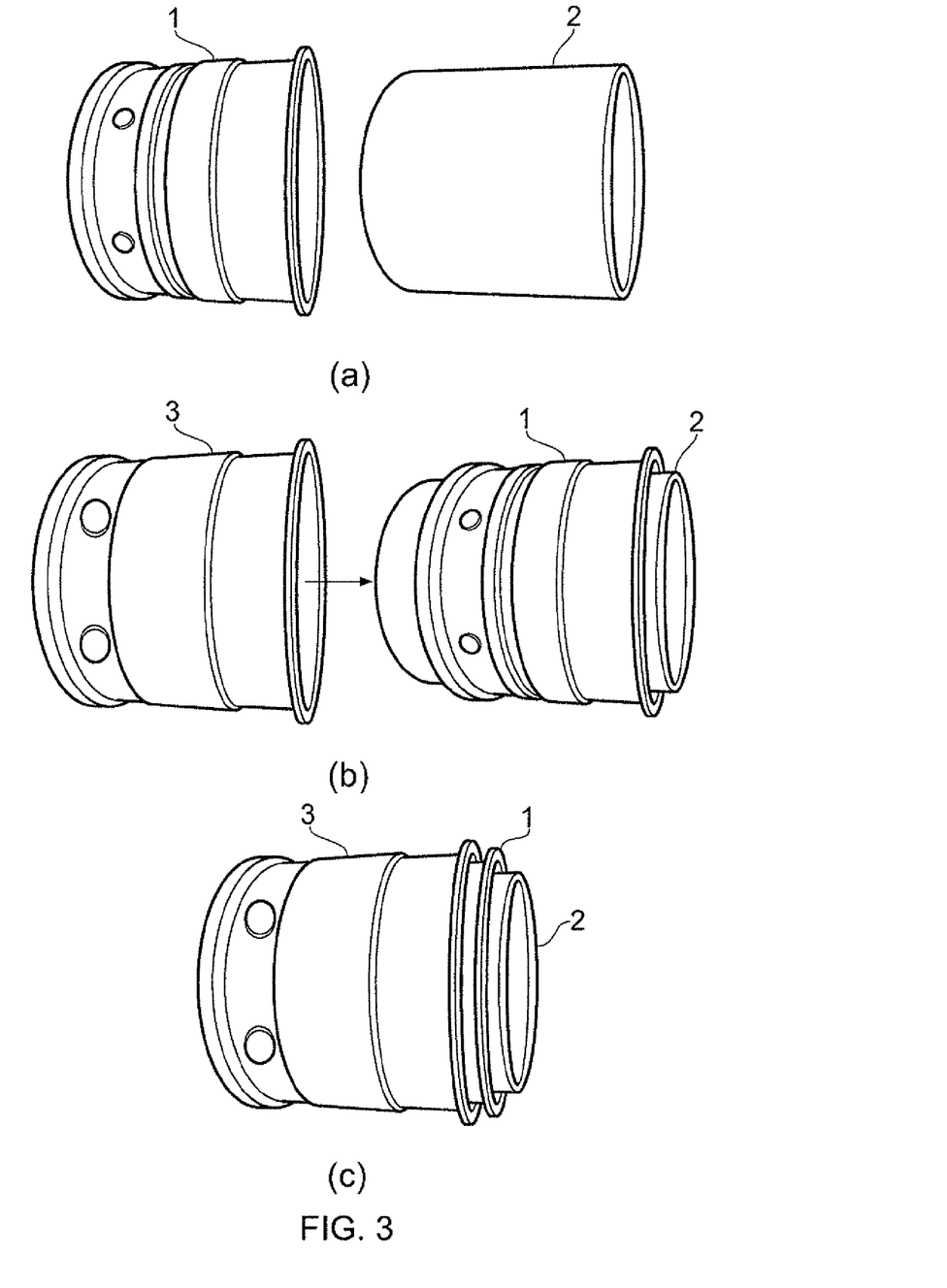
FIGS. 3 shows (a) fitting an inner part of a cathode to the workpiece of FIG. 2, (b) fitting an outer part of the cathode to the workpiece, and (c) the complete assembly of the workpiece and the inner and outer parts of the cathode.
Figure 4:
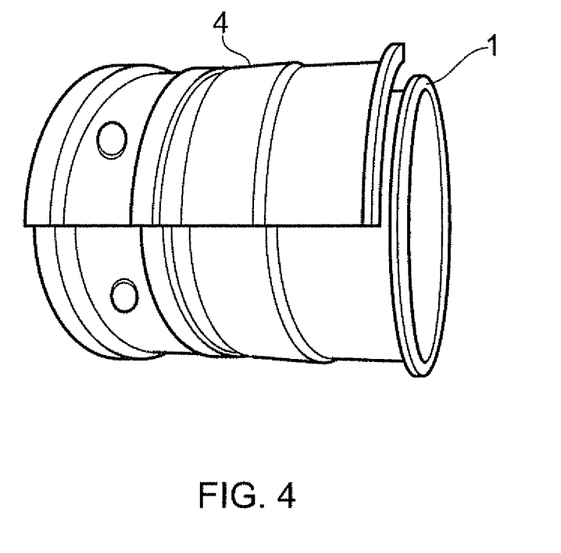
FIG. 4 shows a section of an outer part of a cathode for the workpiece of FIG. 2.
Figure 5:
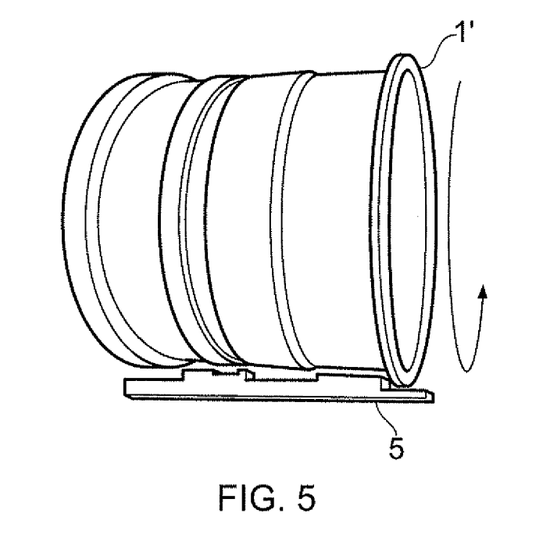
FIG. 5 shows an outer part of a cathode for a generally annular workpiece.

FIG. 3 shows (a) fitting the inner part 2 of the cathode to the workpiece 1 of FIG. 2, (b) fitting the outer part 3 of the cathode to the workpiece, and (c) the complete assembly of the workpiece and the inner and outer parts of the cathode. FIG. 4 shows an example of a section 4 of an outer part of the cathode, the section covering only a portion of the outer surface of the workpiece. If, as shown in FIG. 5, the inner or outer surface of the workpiece 1' has a circumferentially continuous form, or if non-circumferentially continuous features on the surface of the workpiece are of sufficiently low profile such that any preferential material removal therefrom can be tolerated, then it is possible to use a cathode part 5 which is relatively narrow in the circumferential direction. The narrow cathode part and the workpiece can be rotated (indicated by the arrow in FIG. 5) relative to each other such that the cathode part moves over the respective surface to effect material removal over the entire surface.

Figure 6:
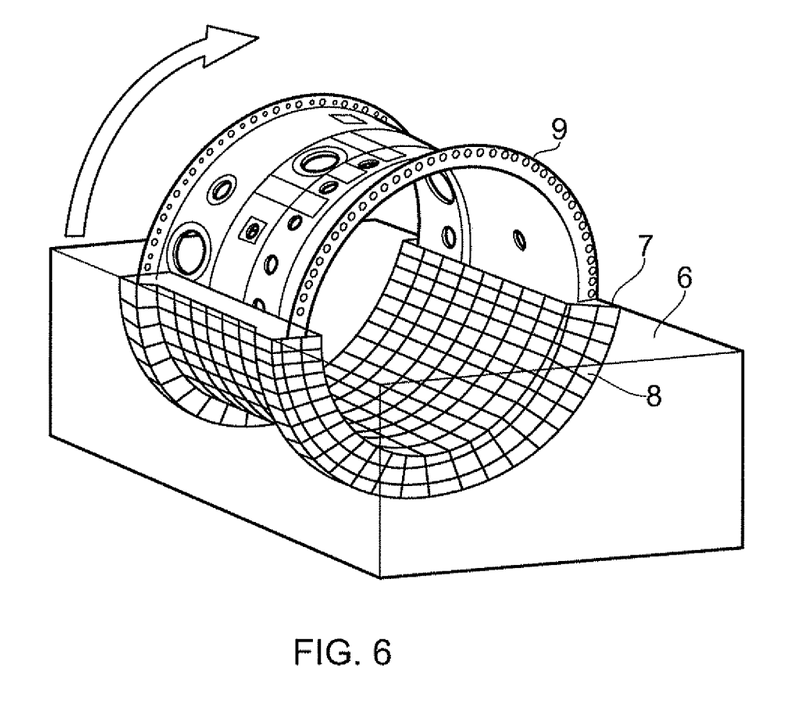
FIG. 6 shows a partially immersed workpiece and a cathode.

Alternatively, as shown in FIG. 6, where the inner or outer surface of the workpiece 1' has a circumferentially continuous form (such as the workpiece of FIG. 5), a workpiece, such as a gas turbine outer case 1 can be partially submerged in an electrolyte bath 6. A cathode in the form of a mesh 7 having a plurality of openings 8 is also submerged in the electrolyte bath 6, extending around the submerged section of the internal and external surfaces of the workpiece 1. The workpiece 1 is continuously rotated at a speed of approximately 6 revolutions per minute (rpm) or less relative to the cathode 8 such that the cathode 8 remains submerged in the electrolyte bath 6, and the entire annulus of the workpiece 1 is eventually submerged after one complete revolution. The rotation of the workpiece 1 thus ensures complete, even surface treatment.

The rotational speed may be increased for smaller diameter workpieces and conversely decreased for larger work-pieces in an attempt to maintain a broadly similar circumferential linear velocity. The openings provided in the mesh also ensure a continuous flow of electrolyte to the polished regions and also promotes effective gas bubble evacuation, further improving the process.

Figure 7:
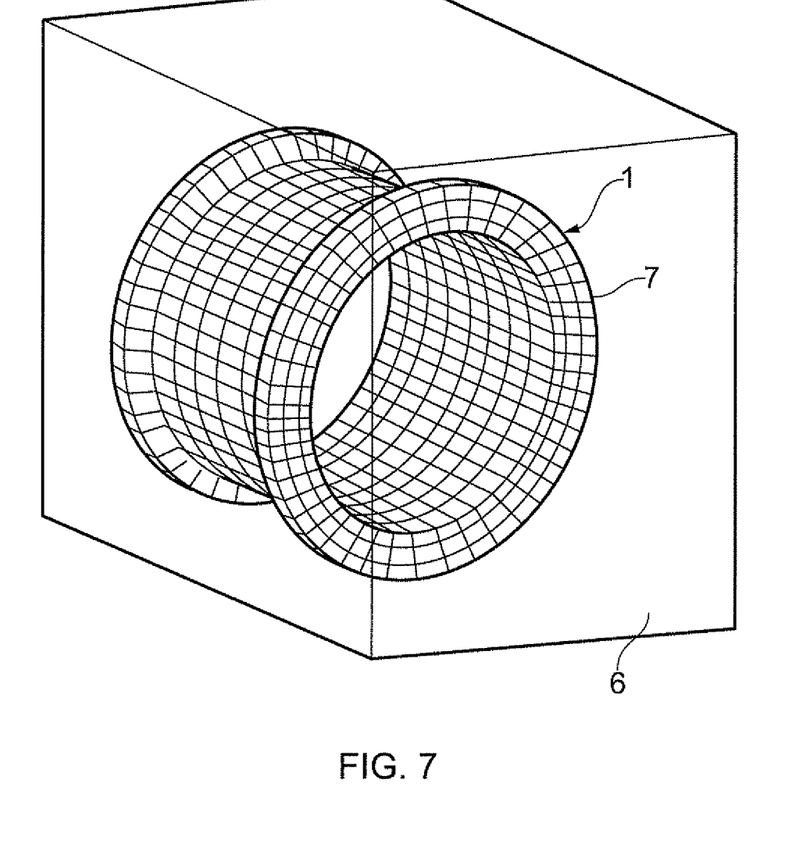
FIG. 7 shows a fully immersed workpiece and a cathode.

As a still further alternative, the whole workpiece 1 and cathode 7 could be immersed in the electrolyte bath 6, as shown in FIG. 7. Again, this process would be suitable where workpiece has a circumferentially continuous form. In this case, the cathode 7 would surround substantially all of the internal and external surfaces of the annular workpiece, such that all of the workpiece is electropolished simultaneously. To avoid preferential removal of a thicker surface layer from some parts of the workpiece due to macroscopic variations in the surface (such as flanges 9), the workpiece 1 is rotated as the electropolishing is carried out. The rate of rotation is similar as for the partially submerged process shown in FIG. 6.

Where the workpiece does not have a circumferentially continuous form, it may be necessary for the cathode to mirror the shape of the workpiece around the entire annulus. In this case, the workpiece and the cathode would be wholly submerged in the electrolyte bath, as shown in FIG. 7. However, in this case, the cathode and workpiece would be rotated together to maintain alignment with each other during the electropolishing process, while enabling continuous flow of electrolyte and gas bubble evacuation.

The distance between the workpiece and cathode is typically in the range from 7 to 80 mm. Maintaining such a distance can allow sufficient electrolyte to be situated in the space between the anode and cathode such that ions can be transported in solution away from the workpiece, while reactants can be held in solution without the need for complex flow control systems to replenish the electrolyte, although electrolyte conditioning can help to maintain the composition of the electrolyte and the effectiveness of the surface treatment process. The substantially constant distance between the workpiece and cathode also ensures that an even layer of material is removed from the treated surface of the workpiece, thereby ensuring that the diffusion layer is removed from all surfaces whilst substantially maintaining the shape of the component.

Surface layer removal of the workpiece is effected by anodic dissolution in which the surface of the anode workpiece is passivated, leading to material removal from the surface. In this process, electrons pass from the anode to the cathode via the external circuit, and electrical energy passivates the surface atoms of the positively charged anode, converting surface atoms of the workpiece to positively charged metal ions which are soluble in the electrolyte. A small amount of plating can take place on the cathode, but the metal ions primarily react out in the electrolyte solution to form e.g. salts, oxides or hydroxides. The electrolyte temperature is controlled and depends upon electrolyte composition, but may typically be in the range from 45 to 75° C. The current density can be in the range from 5 to 20 A/dm$^2$. The electrolyte typically contains one or more of phosphoric acid, sulphuric acid and a single or multiple alkane sulfonic acid. Glycolic acid may optionally be added to further improve surface finish.

Figure 8:
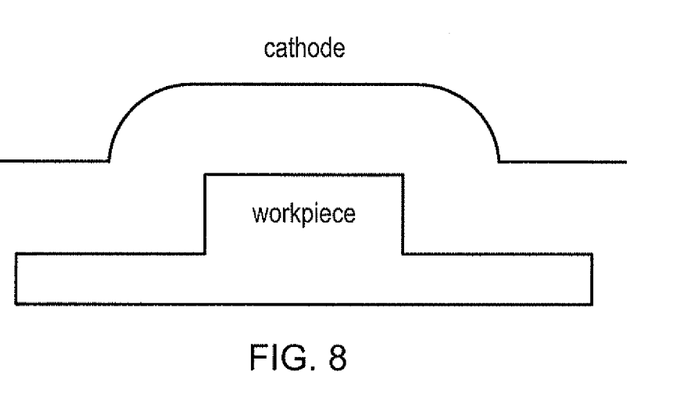
FIG. 8 shows schematically a cathode form around external corners on a workpiece, the cathode being configured to maintain or increase the anode-cathode gap around the corners.
Figure 9:
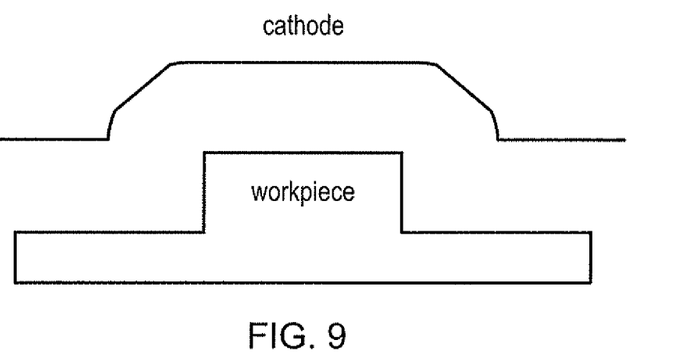
FIG. 9 shows schematically a cathode form around external corners on a workpiece, the cathode being configured to decrease the anode-cathode gap around the corners.
Figure 10:
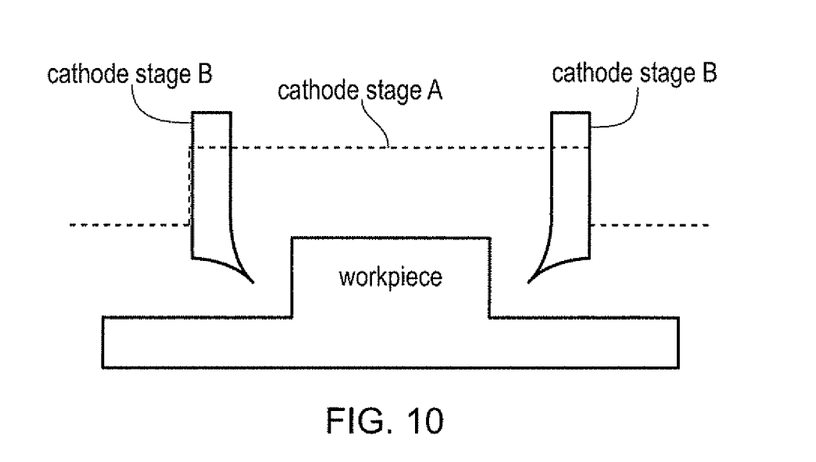
FIG. 10 shows a two stage cathode where initially applied cathode stage A (dashed line) has a form which mirrors the workpiece, and subsequently applied cathode stage B (continuous line) has a form which focuses current density at internal corners on the workpiece.

The electropolishing process can remove substantial amounts of material, e.g. surface layer thickness removal in the range from 0 up to 300 μm. Removal of material to such depths from nickel base superalloy workpieces permits the elimination of most diffusion band surface layers. However, the thickness of the surface layer removed by the electropolishing process for a given workpiece will be substantially uniform over the electropolished surface such that the shape of the workpiece following the electropolishing step is substantially the same as the shape of the workpiece following the isostatic pressings step. In general, the variation in surface layer thickness will be less than one sixth of the thickness. In one example, where the surface layer thickness removed by the electropolishing process is 300 µm, the variation in surface layer thickness across the surface of the workpiece is a maximum of 50 µm. In a further example, where the surface layer thickness removed by the electropolishing process is 500 µm, the variation in surface layer thickness across the surface of the workpiece is a maximum of 70 µm In order to exploit effects associated with preferential material removal during eletrochemical machining, the cathode can be configured with various feature transitions. For example, in FIG. 6, the cathode form around external corners on the workpiece is configured to maintain or increase the anode-cathode gap around the corners, which has an effect of maintaining or slightly increasing the current density at the corners, resulting in a rate of material removal at the corners which is similar to the rate of material removal on the adjacent flat areas. In FIG. 7, in contrast, the cathode around projecting corners on the workpiece is configured to decrease the anode-cathode gap around the corners, resulting in the rate of material removal at the corners being greater than at the adjacent flat areas. In this way, a fillet or chamfer can be formed on the workpiece corners. FIG. 8 shows a two stage cathode where initially applied cathode stage A (dashed line) has a form which mirrors the workpiece, and subsequently applied cathode stage B (continuous line) has a form which focuses current density at internal corners on the workpiece, resulting in increased material removal to produce stress relieving fillets at the internal corners.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of producing a component comprising the steps of:
    providing a workpiece generated by hot isostatic pressing a powder metal form; and
    electropolishing a surface of the workpiece to remove a substantially uniform surface layer of the workpiece to produce the component, wherein
    during the electropolishing step, both the workpiece and a cathode are wholly immersed in an electrolyte, and the workpiece and the cathode are rotated together, such that substantially no relative movement between the workpiece and the cathode occurs, and
    following the electropolishing step, the component has substantially the same shape as the workpiece produced by the hot isostatic pressing step.

2. A method according to claim 1, wherein
    the workpiece comprises a nickel base superalloy and has a diffusion band contaminated by diffusion of elements from tooling during the hot isostatic pressing, and the metal has a composition by weight % of 14.0-19.0 cobalt, 14.35-15.15 chromium, 4.25-5.25 molybdenum, 1.35-2.15 tantalum, 3.45-4.15 titanium, 2.85-3.15 aluminium, 0.01-0.025 boron, 0.012-0.033 carbon, 0.05-0.07 zirconium, 0.5-1.0 hafnium, up to 1.0 rhenium, up to 2.0 tungsten, less than 0.5 niobium, up to 0.1 yttrium, up to 0.1 vanadium, up to 1.0 iron, up to 0.2 silicon, up to 0.15 manganese and balance nickel plus incidental impurities, and
    the surface of the workpiece is electropolished at a current density in the range from 5 to 50 A/dm$^2$ to remove a substantially uniform surface layer of the workpiece, including the diffusion band.

3. A method according to claim 1, wherein the providing step is a step of:
    hot isostatic pressing the powder metal form to generate the workpiece.

4. A method according to claim 1, wherein the produced component is a net shape or near net shape component.

5. A method according to claim 1, wherein the removed surface layer has a thickness in the range 0 to 500 µm.

6. A method according to claim 1, wherein the removed surface layer has a thickness in the range 0 to 300 µm.

7. A method according to claim 5, wherein the variation in the thickness of the surface layer removed by the electropolishing step is less than 83 µm.

8. A method according to claim 7, wherein the variation in the thickness of the surface layer removed by the electropolishing step is less than 70 µm.

9. A method according to claim 5, wherein the variation in the thickness of the surface layer removed by the electropolishing step is less than one third of the thickness of the surface layer.

10. A method according to claim 9, wherein the variation in the thickness of the surface layer removed by the electropolishing step is less than one sixth of the thickness of the surface layer.

11. A method according to claim 1, wherein, during the electropolishing, the workpiece is bathed in an electrolyte containing one or more acids selected from the group consisting of sulphuric acid, phosphoric acid and sulfonic acid.

12. A method according to claim 1, wherein, during the electropolishing, the electrolyte is maintained at a temperature in the range from 15 to 95° C.

13. A method according to claim 1, wherein, during the electropolishing, the workpiece forms an anode and the surface layer of the workpiece is removed by anodic dissolution.

14. A method according to claim 13, wherein, during the electropolishing, the distance between the workpiece and a cathode is in the range from 7 to 80 mm.

15. A method according to claim 1, wherein the component is an annular gas turbine engine component.

16. A method according to claim 13, wherein,
    the component is an annular gas turbine engine component; and
    a cathode is a two-part cathode having an inner part facing the inner surface of the annulus and an outer part facing the outer surface of the annulus.

17. A method according to claim 1, wherein during the electropolishing step, the cathode surrounds at least part of a submerged part of the workpiece.

18. A method according to claim 1, wherein the cathode comprises a mesh defining a plurality of openings through which electrolyte can flow.

* * * * *